US012657745B2

(12) United States Patent
Li

(10) Patent No.: US 12,657,745 B2
(45) Date of Patent: Jun. 16, 2026

(54) IMAGE PROCESSING METHOD FOR ALIGNING IMAGES

(71) Applicant: Novatek Microelectronics Corp., Hsinchu (TW)

(72) Inventor: Dongyuan Li, Taichung City (TW)

(73) Assignee: Novatek Microelectronics Corp., Hsinchu (TW)

( * ) Notice: Subject to any disclaimer, the term of this patent is extended or adjusted under 35 U.S.C. 154(b) by 258 days.

(21) Appl. No.: 18/540,878

(22) Filed: Dec. 15, 2023

(65) Prior Publication Data

US 2025/0200768 A1 Jun. 19, 2025

(51) Int. Cl.
*G06T 7/33* (2017.01)
*G06T 3/4007* (2024.01)
*G06T 3/4038* (2024.01)

(52) U.S. Cl.
CPC .............. *G06T 7/33* (2017.01); *G06T 3/4007* (2013.01); *G06T 3/4038* (2013.01); *G06T 2200/32* (2013.01)

(58) Field of Classification Search
None
See application file for complete search history.

(56) References Cited

U.S. PATENT DOCUMENTS

| | | | | | |
|---|---|---|---|---|---|
| 6,018,349 | A | * | 1/2000 | Szeliski | G06T 7/33 |
| | | | | | 345/629 |
| 2008/0240523 | A1 | * | 10/2008 | Benkley | G06V 40/1335 |
| | | | | | 382/126 |

| | | | | | |
|---|---|---|---|---|---|
| 2011/0249910 | A1 | * | 10/2011 | Henderson | G06V 10/993 |
| | | | | | 382/278 |
| 2012/0082394 | A1 | * | 4/2012 | Su | G06T 3/4007 |
| | | | | | 382/236 |
| 2013/0013185 | A1 | * | 1/2013 | Smitherman | H04N 23/55 |
| | | | | | 348/148 |
| 2014/0118483 | A1 | * | 5/2014 | Rapoport | H04N 5/2628 |
| | | | | | 348/36 |
| 2014/0267593 | A1 | * | 9/2014 | Kim | H04N 23/698 |
| | | | | | 348/36 |

(Continued)

FOREIGN PATENT DOCUMENTS

| | | |
|---|---|---|
| CN | 116405782 | 7/2023 |

OTHER PUBLICATIONS

Lin et al., "Adaptive As-Natural-As-Possible Image Stitching," 2015 IEEE Conference on Computer Vision and Pattern Recognition (CVPR), Oct. 15, 2015 (Year: 2015).*

(Continued)

*Primary Examiner* — Soo Shin
(74) *Attorney, Agent, or Firm* — JCIPRNET

(57) ABSTRACT

An image alignment method is proposed. The method includes to obtain a first image and a second image of a scene, identify a first overlapping region in the first image and a second overlapping region in the second image, distribute anchor points over the first overlapping region and the second overlapping region at regular intervals, and align the first image and the second image according to the anchor points in the first overlapping region and the second overlapping region, where the first overlapping region and the second overlapping region are an overlapping region between the first image and the second image.

11 Claims, 8 Drawing Sheets

(56)                References Cited

U.S. PATENT DOCUMENTS

| | | | |
|---|---|---|---|
| 2016/0086379 A1* | 3/2016 | Sadi | G02B 27/0093 |
| | | | 345/633 |
| 2019/0188871 A1* | 6/2019 | Fletcher | H04N 13/156 |
| 2021/0082086 A1* | 3/2021 | Bichu | G06T 5/80 |

OTHER PUBLICATIONS

Yu et al., "Parallax-Tolerant Image Stitching with Epipolar Displacement Field," arXiv:2311.16637v1, Nov. 28, 2023 (Year: 2023).*
"Office Action of Taiwan Counterpart Application", issued on Sep. 25, 2024, p. 1-p. 7.

* cited by examiner

IMAGE PROCESSING METHOD FOR ALIGNING IMAGES

TECHNICAL FIELD

The disclosure relates to an image processing technique.

BACKGROUND

Algorithms for aligning and stitching images captured from different field of views with overlapping regions into a panorama image are extensively proposed in computer vision.

However, most implementations fail to consider images with significant amount of parallax and result in visible artifacts, discontinuities, and distortions in the overlapping regions.

SUMMARY OF THE DISCLOSURE

To solve the prominent issue, an image processing method is proposed.

According to one of the exemplary embodiments, the method includes to obtain a first image and a second image of a scene, identify a first overlapping region in the first image and a second overlapping region in the second image, distribute anchor points over the first overlapping region and the second overlapping region at regular intervals, and align the first image and the second image according to the anchor points in the first overlapping region and the second overlapping region, where the first overlapping region and the second overlapping region are an overlapping region between the first image and the second image.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
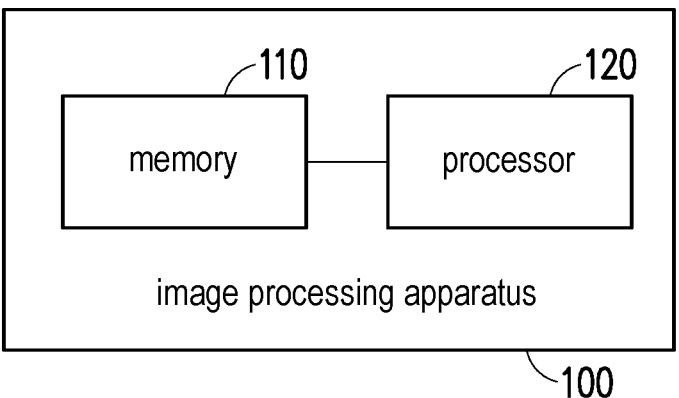
FIG. 1 illustrates a schematic diagram of an image processing apparatus in accordance with an exemplary embodiment of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of an image processing apparatus in accordance with an exemplary embodiment of the disclosure. All components and configurations of the apparatus are first introduced in FIG. 1. The functionalities of the components are disclosed in more detail in conjunction with FIG. 2.

Referring to FIG. 1, an image processing 100 would at least include a memory 110 and a processor 120. The image processing 100 may be an electronic system or a computer system. The memory 110 may be many forms of random-access memory (RAM) such as a dynamic random-access memory (DRAM). The processor 120 may be one or more of a North Bridge, a South Bridge, a field programmable array (FPGA), a programmable logic device (PLD), an application specific integrated circuit (ASIC), other similar devices, or a combination thereof. The processor 120 may also be a central processing unit (CPU), a programmable general purpose or special purpose microprocessor, a digital signal processor (DSP), a graphics processing unit (GPU), other similar devices, or a combination thereof.

Figure 2:
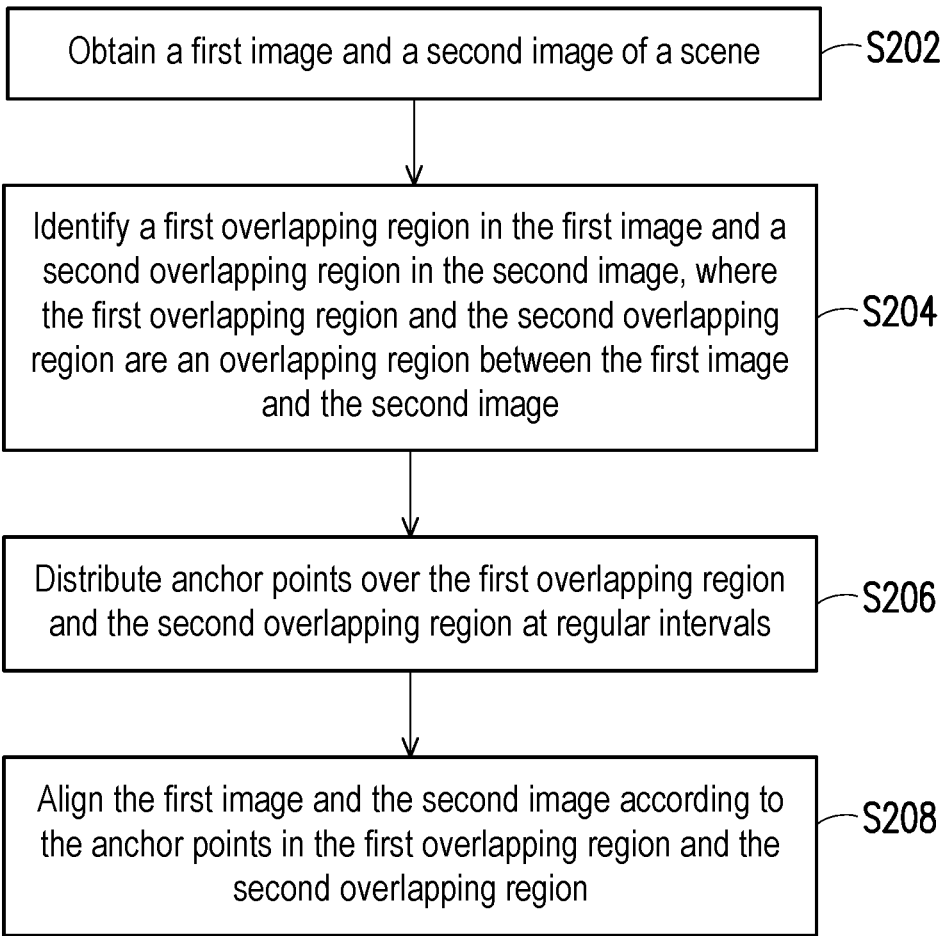
FIG. 2 illustrates a flowchart of an image processing method in accordance with an exemplary embodiment of the disclosure.

FIG. 2 illustrates a flowchart of an image processing method in accordance with an exemplary embodiment of the disclosure, where the steps of FIG. 2 could be implemented by the image processing apparatus 100 as illustrated in FIG. 1.

Referring to FIG. 2 in conjunction with FIG. 1, the processor 120 of the image processing apparatus 100 would obtain a first image and a second image of a scene (Step S202) and would identify a first overlapping region in the first image and a second overlapping region in the second image (Step S204). Herein, the first overlapping region and the second overlapping region would be an overlapping region between the first image and the second image, where the two overlapping regions capture the same spot with different viewpoints. In one embodiment, the two images may be images captured simultaneously by different cameras facing different angles in order to capture a wider angle of view. The two images may be transmitted to the image processing apparatus 100 in real-time wired or wirelessly, or stored on a local database or a cloud server for later processing and analysis. In addition, the two images may be subject to camera calibrations for image reprojection, consistent brightness and contrast, noise removal after being captured, and the disclosure is not limited in this regard.

Next, the processor 120 would distribute anchor points over the first overlapping region and the second overlapping region at regular intervals (Step S206). That is, the anchor points may be distributed uniformly over the overlapping region between the first image and the second image regardless of the complexity of image contents. The density of anchor points may be set to, for instance, 20 pixels, which means that the distance between each anchor point is 20 pixels. In other words, each anchor point is equally apart from each other.

Next, the processor 120 would align the first image and the second image according to the anchor points in the first overlapping region and the second overlapping region (Step S208). Image alignment may be based on each pair of anchor points at the same positions (i.e. a correspondence) in the first overlapping region and the second overlapping region. Since the distribution of the anchor points is irrelevant to image content, the proposed scheme works effectively even for a scene with low contrast, less texture, no corner or edges, or multiple depths as compared with the existing prior approaches that ultimately lead to poor image alignments.

For better comprehension, FIG. 3A-FIG. 3F illustrates schematic diagrams and implementations of an image processing method in accordance with one of the exemplary embodiments of the disclosure, and the method of FIG. 3A-FIG. 3F could also be implemented by the image processing apparatus 100 as illustrated in FIG. 1.

Figure 3A:
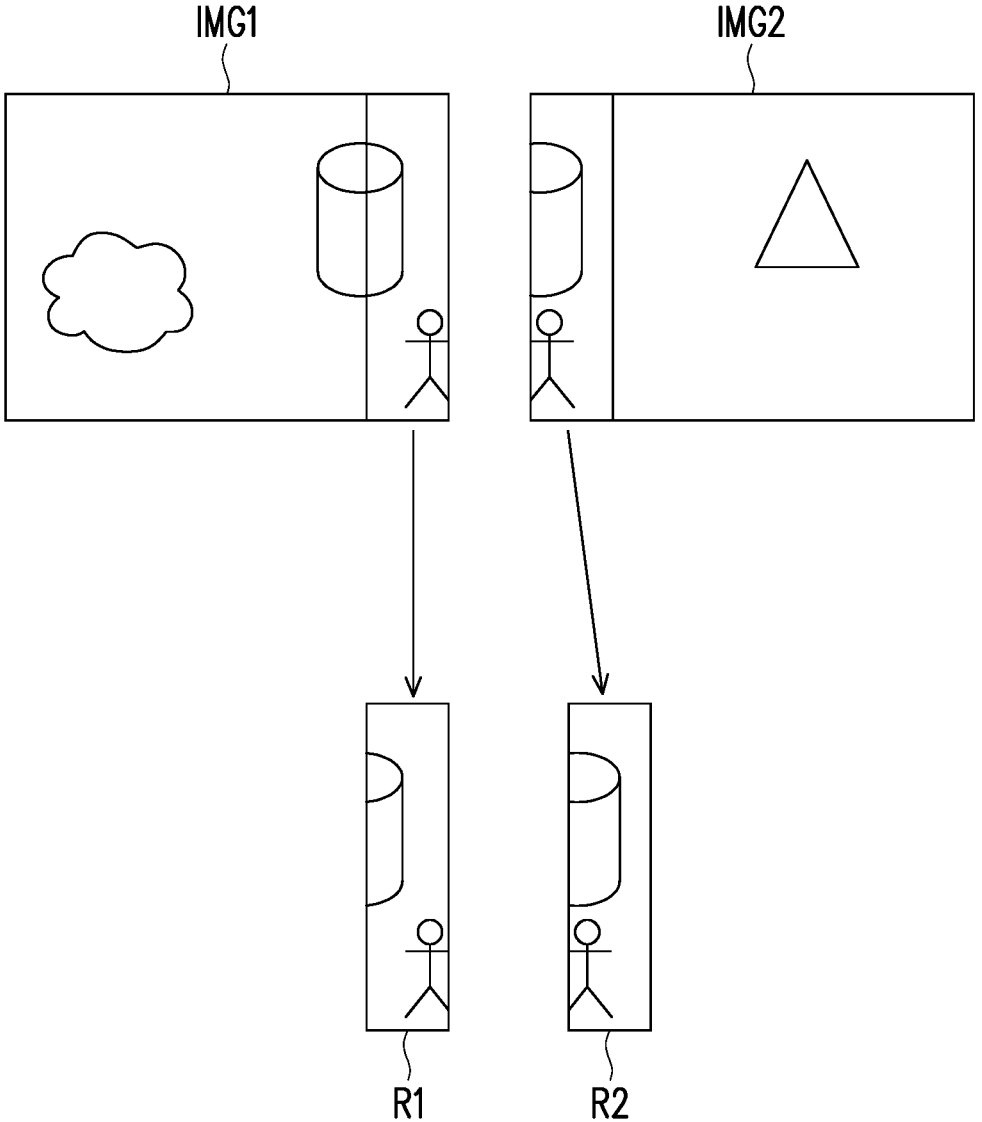
FIG. 3A-FIG. 3F illustrates schematic diagrams and implementations of an image processing method in accordance with one of the exemplary embodiments of the disclosure.

Referring to FIG. 3A in conjunction to FIG. 1, the processor 120 would first obtain a first image IMG1 and a second image IMG2 of a scene and would identify a first overlapping region R1 in the first image IMG1 and a second overlapping region R2 in the second image IMG2. Herein, the first image IMG1 and the second image IMG2 are captured simultaneously by different cameras facing different angles and may be subject to camera calibrations.

Figure 3B:
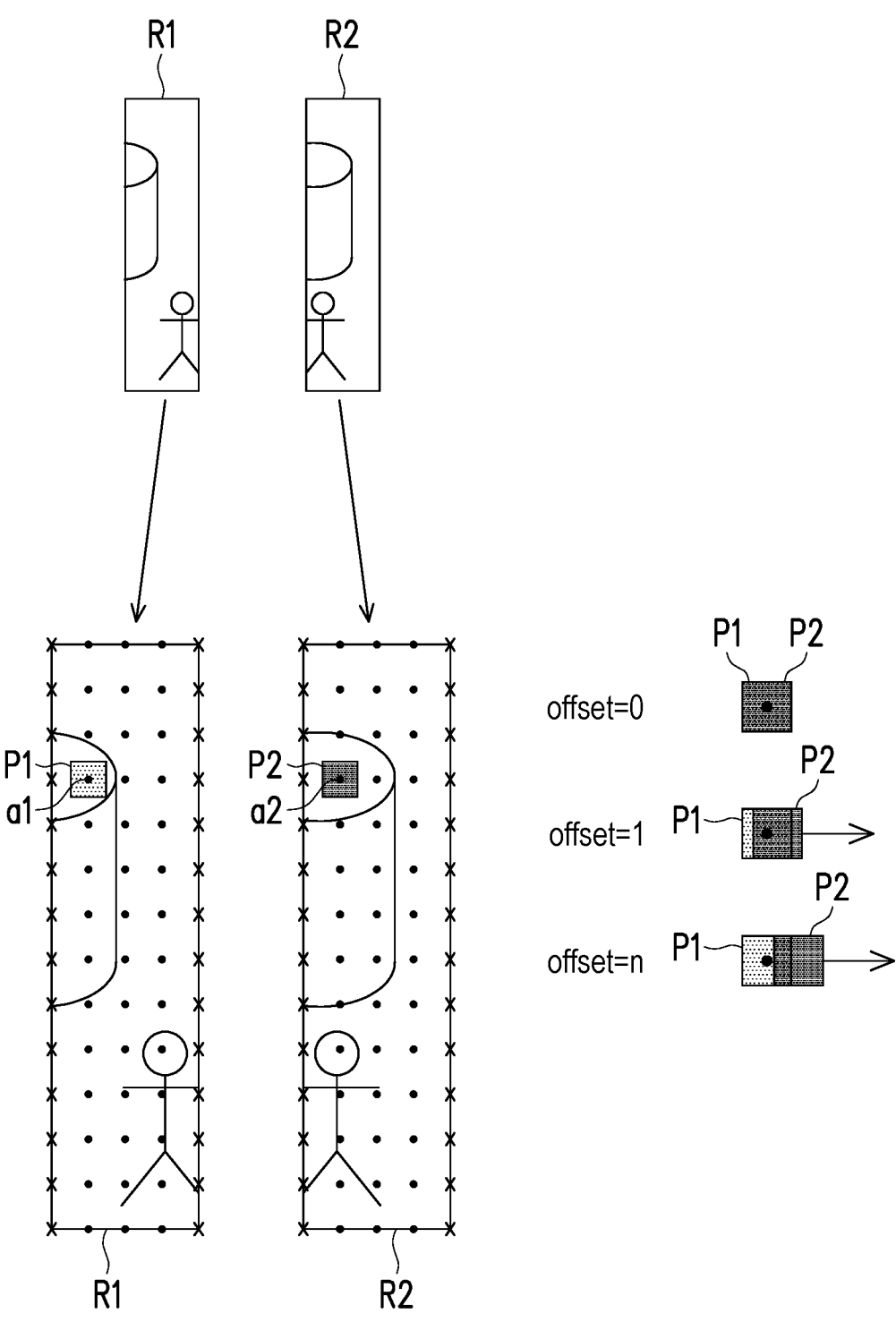

Next, referring to FIG. 3B in conjunction to FIG. 1, the processor 120 would distribute anchor points over the first overlapping region R1 and the second overlapping region R2 at regular intervals. Note that each two anchor points at the same positions respectively in the first overlapping region R1 and the second overlapping region R2 may be treated as a correspondence. Next, the processor 120 would compute a feature offset between two anchor points in each correspondence according to a patch centered at each the two anchor points in each correspondence.

For illustrated purposes, a first anchor point a1 in the first overlapping region R1 and a second anchor point a2 at the same pixel position in the second overlapping region R2 are a correspondence, and the first patch P1 and the second patch P2 are two patches respectively corresponding to the first anchor point a1 and the second anchor point a2. The processor may determine a feature offset between the first anchor point a1 and the second anchor point a2 by shifting the first patch P1 and the second patch P2 within a given range of the first overlapping region R1 and the second overlapping region R2 (i.e. resulting in different offsets between the patches P1 and P2) to the best matching positions based on a predetermined statistical criterion such as the sum of squared differences (SSD) of pixel values between the two patches P1 and P2. Such statistical criterion is referred to as "matching cost" hereafter.

For example, when the offset between the patches P1 and P2 is 0, which means that the first patch P1 and the second patch P2 are both at their original positions, the processor 120 may compute a matching cost SUM_0. When the offset between the first patch P1 and the second patch P2 is 1, which means that the second patch P2 is shifted 1 pixel to the right, the processor 120 may compute a matching cost SUM_1. Deduced in a similar fashion, when the offset between the first patch P1 and the second patch P2 is N, which means that the second patch P2 is shifted N pixels to the right, the processor 120 may compute a matching cost SUM_N. The processor 120 would set the minimum value among the matching costs SUM_0, SUM_1, . . . , and SUM_N as the feature offset between the first anchor point a1 and the second anchor point a2. From another perspective, when the first patch P1 and the second patch P2 are positioned at the best matching positions (i.e., the positions with the minimum matching costs), the features in P1 and P2 exhibit the highest degree of similarity.

Note that in various scenarios, some feature offsets may be unreliable due to lack of reference features, excessive noises, and so forth. In one exemplary embodiment, in terms of temporal perspective, if the two overlapping regions are obtained respectively from two sequences of video frames, the processor 120 may compute feature offsets for each correspondence of multiple consecutive frames (e.g. the first image and at least one first preceding image preceding to the first image in a first image sequence as well as the second image and at least one second preceding image preceding to the second image in a second image sequence) and compute a new feature offset for each correspondence by, for example, taking a mean value of the feature offsets of 5 frames. The original feature offset would be replaced by the new feature offset for each correspondence to increase reliability. In one exemplary embodiment, in terms of spatial perspective, the processor 120 may identify and replace unreliable feature offsets according to a reliability threshold. For example, for two anchor points in a correspondence having a feature offset K with a matching cost SUM_K, if $$\frac{1}{SUM\_K}$$

is less than the reliability threshold, the feature offset K becomes unreliable and would be replaced with a substitution derived from other reliable feature offsets. In one exemplary embodiment, the processor 120 may ensure the reliability of each feature offset from both temporal and spatial perspectives. The disclosure is not limited in this regard. More details are provided for a better understanding from the spatial perspective hereafter.

Figure 3C:
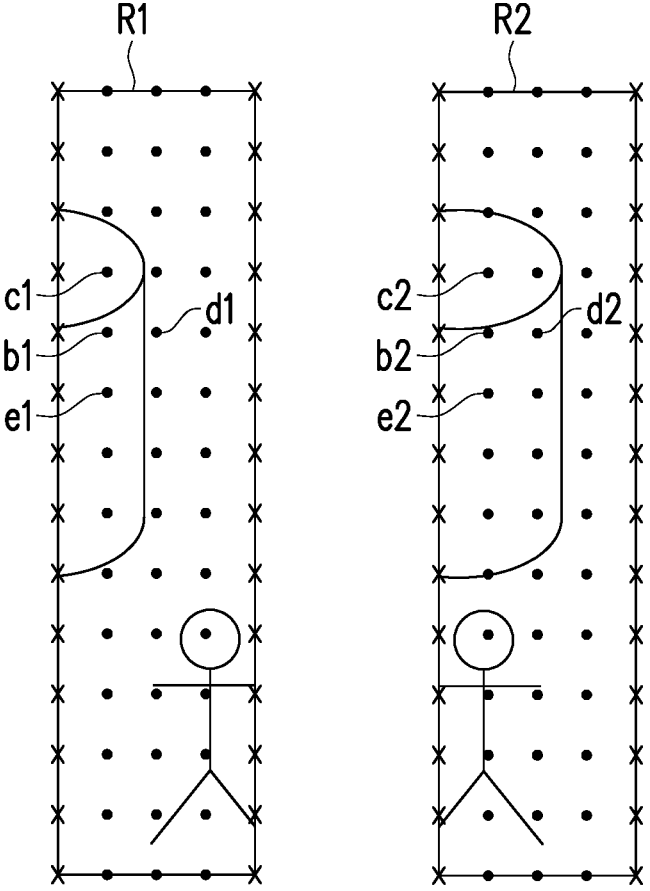

Referring to FIG. 3C in conjunction to FIG. 1, assume that a feature offset between a first anchor point b1 in the first overlapping region R1 and a second anchor point b2 in the second overlapping region R2 is unreliable. The processor 120 may compute a probable feature offset based on feature offsets of neighboring anchor points, such as the feature offset between anchor points c1 and c2, the feature offset between anchor points d1 and d2, and the feature offset between anchor points e1 and e2. For example, the probable feature offset between the first anchor point b1 and the second anchor point b2 may be the mean value of neighboring feature offsets. The original feature offset would be replaced by the probable feature offset as a new feature offset for each correspondence with more reliability.

Figure 3D:
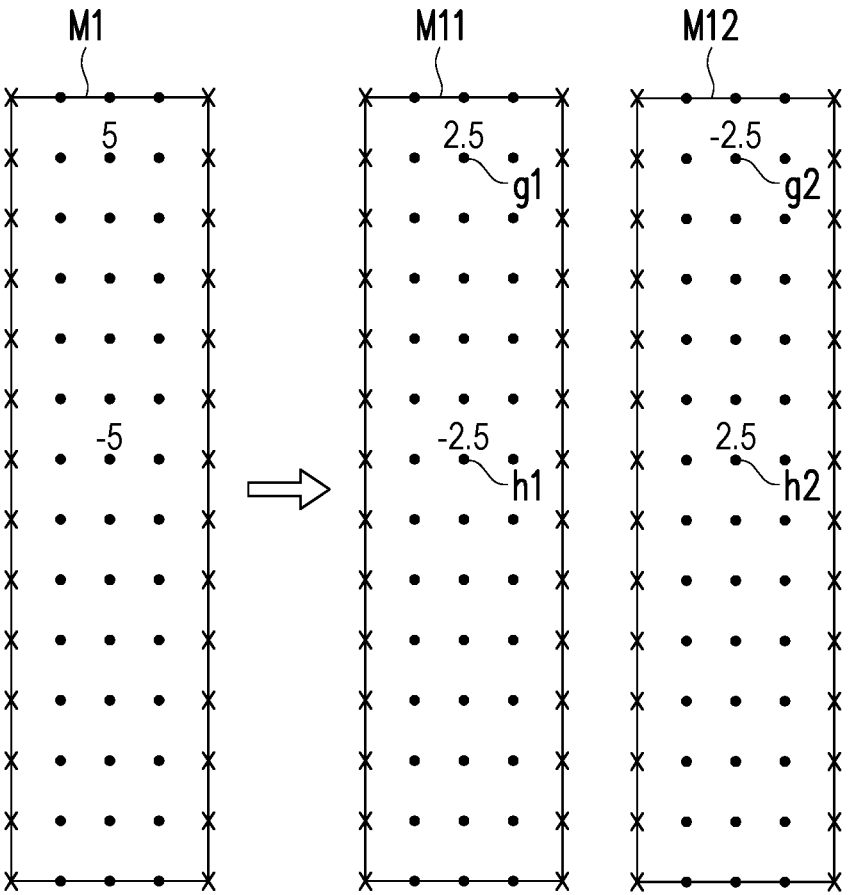

Next, referring to FIG. 3D in conjunction to FIG. 1, the processor 120 would generate a feature offset map M1 based on the reliable feature offsets and the new (replaced) feature offsets, and thereby generating two anchor point offset maps M11 and M12 respectively corresponding to the anchor points in the first overlapping region R1 and the anchor points in the second overlapping region R2. Note that data at corresponding positions in the two anchor point offset maps M11 and M12 have equal magnitudes but opposite signs. For example, assume that a feature offset between anchor points g1 and g2 in the feature offset map M1 is 5. The anchor point offsets for the anchor points g1 and g2 respectively in the anchor point offset maps M11 and M12 would be both half of the magnitude of 5 but with different signs (i.e. 2.5 for the anchor points g1 and −2.5 for the anchor points g2). On the other hand, assume that a feature offset between anchor points h1 and h2 in the feature offset map M1 is −5. The anchor point offsets for the anchor points h1 and h2 respectively in the anchor point offset maps M11 and M12 would be both 2.5 but with different signs (i.e. −2.5 for the anchor points h1 and 2.5 for the anchor points h2).

Figure 3E:
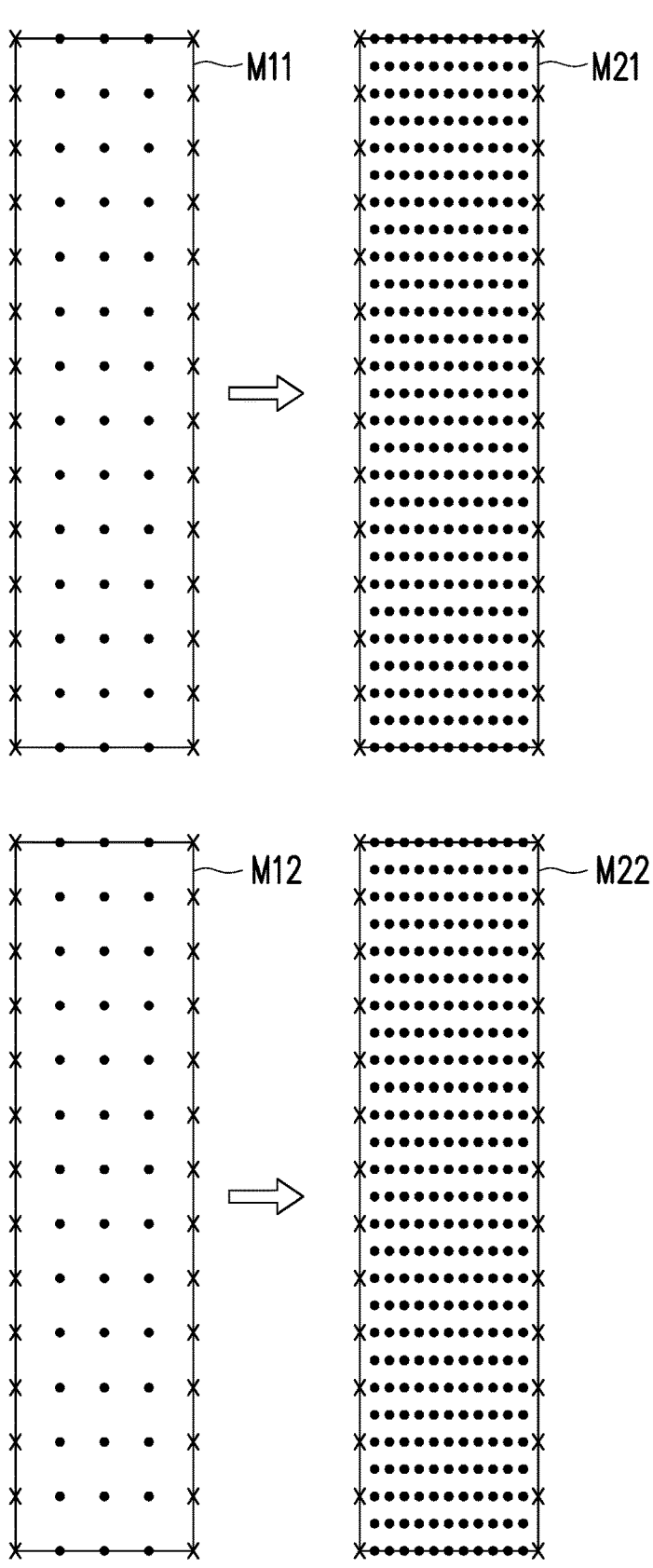

Next, referring to FIG. 3E, the processor 120 may perform interpolation (e.g. pixel-wise linear interpolation) on the anchor point offset map M11 corresponding to the first overlapping region R1 and the anchor point offset map M12 corresponding to the second overlapping region R2 to respectively generate image alignment maps M21 and M22 such that each pixel in the overlapping regions R1 and R2 has a corresponding pixel offset. In other words, the number of the new (interpolated) anchor point offsets and the existing (original) anchor point offsets in each of the anchor point offset map M21 and the anchor point offset map M22 is the same as the number of pixels in each of the first overlapping region R1 and the second overlapping region R2.

Figure 3F:
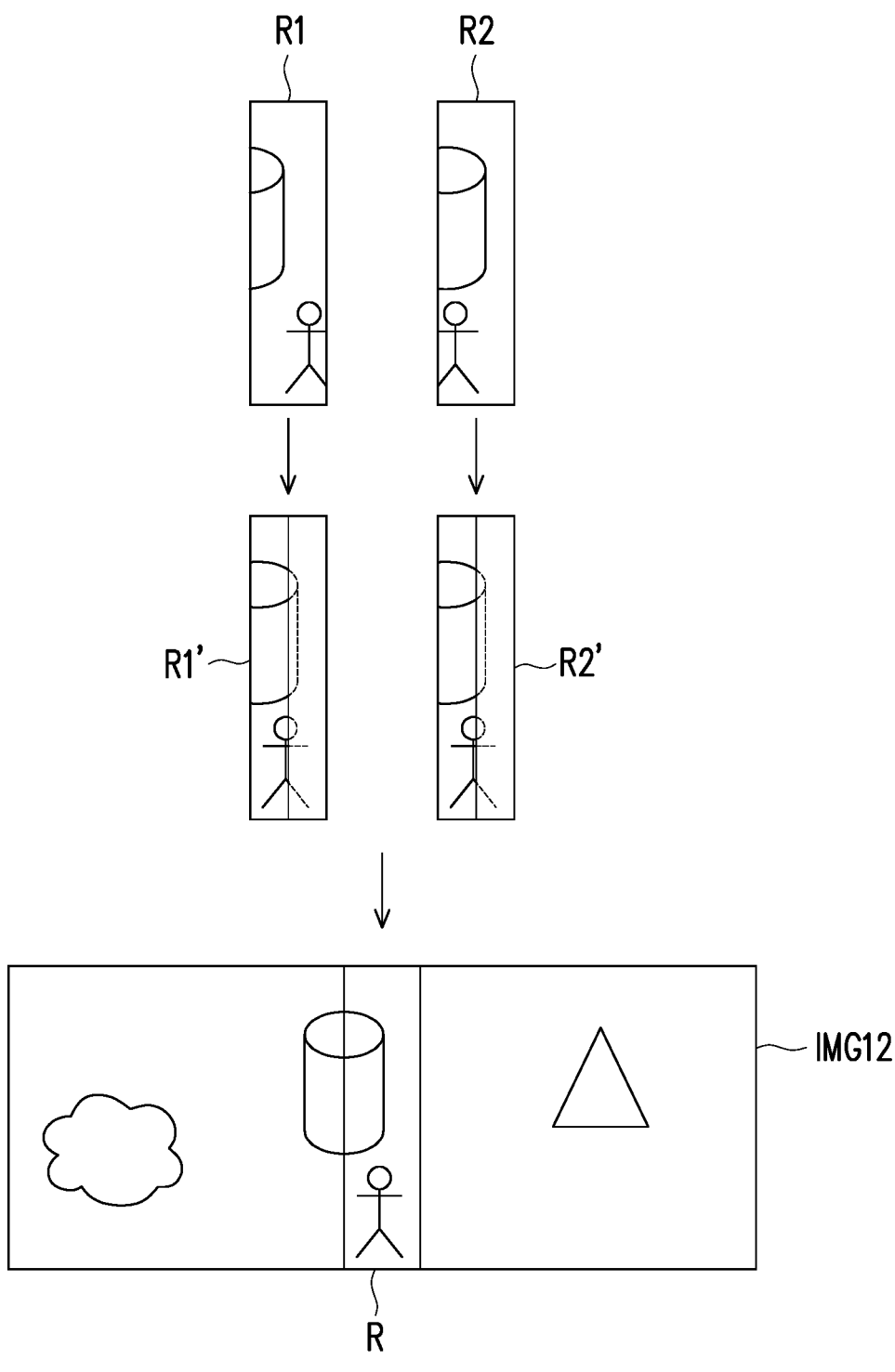

Next, referring to FIG. 3F, the processor 120 may perform image alignment on the overlapping regions R1 and R2 respectively according to the pixel offsets in the image alignment maps M21 and M22 in FIG. 3E to generate a first aligned overlapping region R1' and a second aligned overlapping region R2'. Thereafter, the processor 120 may perform image fusion on the first aligned overlapping region R1' and a second aligned overlapping region R2' based on any of the existing image blending approaches such as alpha blending to generate a seamless fused overlapping region R, and perform image stitching according to the first image, the second image, and the fused overlapping region R to generate a combined image IMG12. In this process, the fused overlapping region R provides a smooth transition between the first image and the second image.

In one exemplary embodiment, image alignment and stitching can be extended to three or more images where there exists an overlapping region between every two images in a similar fashion as presented above. Moreover, the aforesaid framework can offer immediate applications in many areas such as video surveillance, panorama rendering, immersive telepresence and conference, and autonomous driving.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An image processing method comprising:
obtaining a first image and a second image of a scene;
identifying a first overlapping region in the first image and a second overlapping region in the second image, wherein the first overlapping region and the second overlapping region are an overlapping region between the first image and the second image;
distributing a plurality of anchor points over the first overlapping region and the second overlapping region at regular intervals,
wherein each of the anchor points in the first overlapping region and the second overlapping region is equally apart from each other,
wherein the anchor points in the first overlapping region comprise a first anchor point,
wherein the anchor points in the second overlapping region comprise a second anchor point, and
wherein the first anchor point and the second anchor point are at same positions respectively in the first overlapping region and the second overlapping region; and
aligning the first image and the second image according to the first anchor point in the first overlapping region and the second anchor point in the second overlapping region.

2. The image processing method according to claim 1, wherein the step of aligning the first image and the second image according to the first anchor point in the first overlapping region and the second anchor point in the second overlapping region comprises:
computing a feature offset between the first anchor point and the second anchor point;
generating a feature offset map comprising the feature offset between the first anchor point and the second anchor point;
generating a first anchor point offset map and a second anchor point offset map according to the feature offset map;
performing interpolation on the first anchor point offset map and the second anchor point offset map to respectively generate a first image alignment map and a second image alignment map; and
aligning the first overlapping region and the second overlapping region according to the first image alignment map and the second image alignment map.

3. The image processing method according to claim 2, wherein the step of computing the feature offset between the first anchor point and the second anchor point comprises:
setting a first patch centered at the first anchor point and a second patch centered at the second anchor point; and
determine the feature offset between the first anchor point and the second anchor point by shifting the first patch and the second patch respectively in the first overlapping region and the second overlapping region to best match positions.

4. The image processing method according to claim 3, wherein features in the first patch and features in the second patch at the best match positions have highest similarities.

5. The image processing method according to claim 2, wherein after the step of generating the feature offset map, the method further comprises:
computing a new feature offset between the first anchor point and the second anchor point according to at least one first preceding image preceding to the first image in a first image sequence and at least one second preceding image preceding to the second image in a second image sequence, and replacing the feature offset between the first anchor point and the second anchor point by the new feature offset.

6. The image processing method according to claim 2, wherein after the step of generating the feature offset map, the method further comprises:

determining whether the feature offset between the first anchor point and the second anchor point is reliable;

in response to the first feature offset between the first anchor point and the second anchor point is unreliable, computing a new feature offset between the first anchor point and the second anchor point according to a feature offset between a first neighboring anchor point and a second neighboring anchor point, and replacing the feature offset between the first anchor point and the second anchor point by the new feature offset.

7. The image processing method according to claim 2, wherein the first anchor point offset map comprise a plurality of anchor point offsets corresponding to the anchor points in the first overlapping region and the second overlapping region respectively, and wherein the first anchor point offset corresponding to the first anchor point and the second anchor point offset have same magnitudes and different signs.

8. The image processing method according to claim 7, wherein the magnitudes of the first anchor point offset and the second anchor point offset are half of a magnitude of the feature offset between the first anchor point and the second anchor point.

9. The image processing method according to claim 7, wherein the step of performing interpolation on the first anchor point offset map and the second anchor point offset map to respectively generate the first image alignment map and the second image alignment map comprises:

interpolating a plurality of new anchor point offsets between the anchor point offsets corresponding to the anchor points in the first overlapping region and the second overlapping region respectively.

10. The image processing method according to claim 9, wherein the number of the new anchor point offsets and the anchor point offsets in each of the first anchor point offset map and the second anchor point offset map is respectively the same as the number of pixels in each of the first overlapping region and the second overlapping region.

11. The image processing method according to claim 1 further comprising:

performing image blending according to the aligned first overlapping region and the aligned second overlapping region to generate a blended overlapping region; and performing image stitching according to the first image, the second image, and the blended overlapping region to generate a combined image of the scene.

\* \* \* \* \*